(12) United States Patent
Rönblom

(10) Patent No.: US 11,858,105 B2
(45) Date of Patent: Jan. 2, 2024

(54) POWER TOOL AND TORQUE-RESPONSIVE GEAR UNIT FOR A POWER TOOL

(71) Applicant: ATLAS COPCO INDUSTRIAL TECHNIQUE AB, Stockholm (SE)

(72) Inventor: Johan Rönblom, Saltsjö-Boo (SE)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 230 days.

(21) Appl. No.: 17/619,785

(22) PCT Filed: Jun. 16, 2020

(86) PCT No.: PCT/EP2020/066550
§ 371 (c)(1),
(2) Date: Dec. 16, 2021

(87) PCT Pub. No.: WO2020/254281
PCT Pub. Date: Dec. 24, 2020

(65) Prior Publication Data
US 2022/0274243 A1 Sep. 1, 2022

(30) Foreign Application Priority Data
Jun. 18, 2019 (SE) .................................... 1930204-1

(51) Int. Cl.
*B25F 5/00* (2006.01)
(52) U.S. Cl.
CPC .................................... *B25F 5/001* (2013.01)
(58) Field of Classification Search
CPC .... B25F 5/001; B25B 21/008; F16H 61/0295; F16H 2200/0034; F16H 2200/2005
See application file for complete search history.

(56) References Cited

U.S. PATENT DOCUMENTS 3,187,860 A    6/1965    Simmons
4,844,177 A *   7/1989    Robinson .............. B25B 23/145
                                                                   81/473

(Continued)

FOREIGN PATENT DOCUMENTS

EP            226426 A2    6/1987
WO         9625272 A1    8/1996

OTHER PUBLICATIONS

Atlas Copco Industrial Technique AB, International Patent Application No. PCT/EP2020/066550, International Search Report, dated Sep. 29, 2020.

(Continued)

*Primary Examiner* — Thomas M Wittenschlaeger
(74) *Attorney, Agent, or Firm* — Moore & Van Allen PLLC; W. Kevin Ransom

(57) ABSTRACT

The present specification relates to a two-speed power transmission for a power tool comprising a planetary gear and a torque responsive gear shift mechanism for directing torque through the planetary gear in a high torque/low speed mode or past the planetary gear in a low torque/high speed mode, and comprising a driving member, a driven member, and a number of coupling elements arranged to intercouple in a first position the driving member and the driven member and in a second position the planetary gear and the driven member, the driving member comprising a number of recesses and axially acting first cam means for cooperation with the coupling elements in the first position forming part thereof. The present specification also relates to power tool comprising such a gear unit and a method for controlling such a power tool.

14 Claims, 2 Drawing Sheets

(56) References Cited

U.S. PATENT DOCUMENTS

| | | | |
|---|---|---|---|
| 5,083,990 A * | 1/1992 | Rahm | F16H 3/54 |
| | | | 475/263 |
| 5,573,074 A * | 11/1996 | Thames | B25B 21/008 |
| | | | 192/56.62 |
| 2013/0178331 A1 | 7/2013 | Saur | |
| 2017/0014985 A1 | 1/2017 | Sattler | |
| 2019/0047131 A1* | 2/2019 | Ichikawa | B25B 21/02 |
| 2019/0047132 A1* | 2/2019 | Kumagai | B25B 21/008 |
| 2019/0184528 A1* | 6/2019 | Herr | B25B 21/02 |

OTHER PUBLICATIONS

Atlas Copco Industrial Technique AB, International Patent Application No. PCT/EP2020/066550, Written Opinion, dated Sep. 29, 2020.

Atlas Copco Industrial Technique AB, International Patent Application No. PCT/EP2020/066550, International Preliminary Report on Patentability, dated May 26, 2021.

Atlas Copco Industrial Technique AB, Chinese Patent Application No. 202080044622.8, First Office Action, dated Sep. 15, 2023.

* cited by examiner

POWER TOOL AND TORQUE-RESPONSIVE GEAR UNIT FOR A POWER TOOL

CROSS-REFERENCE TO RELATED APPLICATIONS

This application is a National Stage Patent Application (filed under 35 § U.S.C. 371) of PCT/EP2020/066550, filed Jun. 16, 2020 of the same title, which, in turn claims priority to Swedish Patent Application No. 1930204-1 filed Jun. 18, 2019 of the same title; the contents of each of which are hereby incorporated by reference.

FIELD OF THE INVENTION

The present invention generally relates to power tools, more particularly to a torque-responsive gear unit for a power tool.

BACKGROUND OF THE INVENTION

Different types of power tools are known to be used in various industries, where one common type is power tools used for tightening of screw or bolts.

One problem known to cause various design challenges in the field is that the working conditions and the requirements on the expected output tend to vary a lot during use for example with regards to the speed and torque required during different parts of a typical working operation. This is the case for example for the tightening tools mentioned above as during tightening of screws or nuts during the initial phase of the tightening, i.e. the so called run down, the torque needed is low whereas the rotation speed should ideally be high in order to reduce the time required for the operation whereas during the actual tightening phase, i.e. during the actual tightening of the joint, the torque required is higher.

Power tools subjected to these types of varying requirements are however known to, in order to be able to for example provide the desired torque levels, include one or more transmissions such as for example one or more planetary gear steps connected in series.

But, using such transmissions to provide these higher torques, the rotational speed provided decreases correspondingly thus resulting in an undesired lower rotational speed also during run down. This becomes a significant problem particularly in the field of power tools adapted to tighten large screws to very high torque values, where commonly a very low RPM results from the provision of the desired high torque, which in turn commonly makes the rundown phase unreasonably slow.

In order to alleviate some of these problems, attempts have therefore been made to use two-speed power transmissions comprising torque responsive gear shift mechanisms, i.e. transmissions where the force flow through the gear unit, and hence possibly the gear ratio provided, depends on the torque level such that a higher rotational speed may be used during run down and the high torque/low speed mode only when needed.

However, there are many problems associated with such transmissions remaining. For example, many such known transmissions require an operator to manually shift between high speed/low torque mode and low speed/high torque thus increasing complexity for the operator handling the tool. Further, such transmissions are by definition subject to high demands on durability, strength and tolerances, making the design complex as such, further, these requirements also commonly implies that such transmissions tend to require a lot of space and add considerably to the overall size of the tool. Hence, there exists a need for improvement in the field of torque-responsive gear units for power tools.

SUMMARY OF THE INVENTION

Accordingly, it would be desirable to provide a gear unit or power transmission for such a power tool where gear shifting is effected automatically, i.e. without manual intervention by the operator. In particular, it would be desirable to provide such a transmission having a compact and reliable design. To better address one or more of these concerns a gear unit for a tightening tool, a power tool comprising such a gear unit and a method for controlling such a power tool as defined in the independent claims is provided. Preferred embodiments are defined in the dependent claims.

According to a first aspect of the invention a two-speed power transmission for a power tool is provided, the tool comprising a housing, an input shaft and an output shaft. The two-speed power transmission comprising a planetary gear and a torque responsive gear shift mechanism for directing torque through the planetary gear in a high torque/low speed drive mode or past the planetary gear in a low torque/high speed drive mode. The planetary gear including a sun wheel connected to the input shaft, a ring gear secured in the housing and a planet wheel carrier. The gear shift mechanism comprising a driving member connected to the sun wheel of the planetary gear, a driven member connected to the output shaft, and a number of coupling elements arranged to intercouple in a first position the driving member and the driven member and to intercouple in a second position the planet wheel carrier and the driven member. The driven member comprising a number of axially extending grooves arranged to support the coupling elements for axial displacement of the coupling elements between the first and the second position and the driving member comprising an axially acting first cam means for cooperation with the coupling elements in the first position of the coupling elements. A first axially acting spring means is arranged for biasing the coupling elements toward the first position of the coupling elements, whereby the action of the first spring means counteracts the axial force developed by the first cam means upon the coupling elements such that the coupling elements are maintained in the first position at torque values below a predetermined level but forced out of the first position by the first cam means at torque values above the predetermined level and the driven member further comprising second, axially acting cam means arranged to exert an axial shifting force upon the coupling elements toward the second position of the coupling elements against the biasing action of the spring means as the coupling elements have left the first position at torque values above the predetermined level. Wherein the planet wheel carrier is coupled to a coupling sleeve which provides a radial support for the coupling elements in the second position of the coupling elements and which is provided with a number of axially extending tracks for cooperation with the coupling elements in the second position of the coupling elements, and wherein the driving member comprises a number of recesses, wherein the first axially acting cam element each form part of respectively one of the recesses, and wherein each of the recesses are adapted for receiving and radially supporting one of the coupling elements in the first position of the coupling elements.

According to the first aspect, the two-speed transmission provides an inventive solution to the concerns described above by means of a design incorporating a torque responsive gear shift mechanism automatically directing torque through said planetary gear in a high torque/low speed drive mode or past said planetary gear in a low torque/high speed drive mode depending on the torque level, where robustness and reliability is increased by means of an efficient rotational decoupling, or separation, provided between components rotating at a high rotational speed such as the coupling element and components rotating at a lower speed.

More particularly, as the driving member of the inventive transmission incorporates a number of recesses adapted for receiving and radially supporting the coupling elements in the high speed/low torque mode, the coupling elements are efficiently shielded, i.e. decoupled, from the components rotating at a different speed without the provision of additional components. The design therefore cleverly provides a two-speed power transmission having a compact, reliable design.

According to one embodiment, the coupling sleeve is arranged to be axially movable. Hereby, a slight play may be achieved which in turn may be utilized to handle possible angular misalignment of the coupling elements and the coupling sleeve. Especially when the coupling elements move from the first position to the second position, any misalignment between the coupling elements and the axially extending grooves in the driven member may be handled by the axially movable sleeve instead of causing jamming between parts. By misalignment should be understood a slight angular mismatch between the angular position of the coupling elements and the angular position of the recesses arrange to receive the coupling element in the first position.

According to one embodiment, the two-speed power transmission further comprises a second axially acting spring means for biasing the axially movable coupling sleeve against of the coupling elements. Hereby, the misalignment may be even more efficiently handled as the coupling sleeve pushes slightly against the coupling element, thereby facilitating the return into the recesses by a slight force acting on the coupling elements in the right direction. The coupling sleeve commonly stays in the default position, i.e. adjacent to the driving member, but should the coupling elements become misaligned, the coupling sleeve may spring or move slightly in the axial direction under the bias of the spring allowing the coupling elements to slide into the right position.

According to one embodiment, the planet wheel carrier comprises an outer sleeve, the sleeve extending in an axial direction and being rotationally locked to the coupling sleeve to intercouple in the second position the planet wheel carrier and the driven member. In one embodiment, the outer sleeve is rotationally locket to the coupling sleeve by means of a number of balls or other rolling elements arranged in tracks formed on the outside of the coupling sleeve. Accordingly, the torque will in the low speed/high torque mode be directed via the planet carrier, the transferring balls, the coupling sleeve, and further via the coupling elements to the driven member. Further, the outer sleeve may in some embodiments be coaxially arranged with the driven and driving member. In one embodiment, there is an axial overlap between the outer sleeve and the portion of the driving member in which the recesses are arranged and/or at least a portion of the coupling sleeve.

According to one embodiment, a first axial bearing is provided supporting the driving element, i.e. the driving member, against the planetary wheel carrier and a second axial bearing is provided to support the outer sleeve against the housing, such that the force from the first spring means acting on the coupling elements may be absorbed into the tool housing via the first and second bearing. Hereby, an advantageous decoupling between the spring (i.e. the coupling elements) and the motor axle is achieved, relieving the motor axle (i.e. the input shaft) from the axial force exerted by the spring. Instead, this force may be absorbed by the tool housing. Further advantages include the provision of a design having shorter tolerance chains, i.e. less accumulation of tolerances.

According to one embodiment, the coupling elements comprise equally sized balls. The number of balls may be freely chosen depending on for example the size of the tool.

According to one embodiment, the number of tracks in the coupling sleeve is twice the number of coupling elements. Hereby, the risk of misalignment and hence possible jamming is reduced.

According to one embodiment, the driving member comprises an axial flange, the axial flange being arranged to radially support the coupling elements. This is an advantageous design in that improved radial support and rotational decoupling is provided.

According to one embodiment, the combined axial extent of the flange and the depth of the recesses is larger than the radius of the balls. Hereby, sufficient radial support as well as a complete radial decoupling between the balls and the components rotating at a different rotational speed is ensured in high-speed mode.

According to one embodiment, the first spring means comprises a first coil spring which is arranged in a coaxial relationship with the driven member and which exerts a biasing force upon the balls. This is advantageous for example in that a more compact design may be achieved. In one embodiment, the first coil spring bears directly against the coupling elements. In another embodiment, the first coil spring bears against the coupling element via a contact element which is in continuous contact with the coupling elements, examples include a flat ring element. Further, in some embodiment, there may be provided means for varying the setting of the bias force exerted by the spring.

According to one embodiment, the ring gear (or gear rim) may be adapted to be secured in the housing by means of a torque transducer such that readings of the torque transferred may be obtained. The data provided may for example be used to provide traceability, provide operator feedback and/or to control the tool.

According to a second aspect of the present invention, a power tool comprising a two-speed power transmission according to any of the embodiments described above is provided.

According to one embodiment, the power tool comprises a two-speed transmission according to any of the preceding claims, a motor, means for monitoring a quantity indicative of a torque delivered by the tool and a control unit operative to control the rotational speed of the motor based on said monitored quantity indicative of said torque.

In one embodiment, the means for monitoring a quantity indicative of a torque delivered by the tool may comprise at least one sensor for sensing a quantity indicative of a torque delivered. For example, as mentioned above, the ring gear may be secured in the housing by means of a torque transducer such that readings of the torque transferred may be obtained. Further, the means for monitoring a quantity indicative of a torque may comprise circuitry (i.e. a circuit arrangement) adapted to monitor the motor current or other internally provided data related to the performance of the motor.

Hence, the control unit may be configured to control the tool by comparing the value of the quantity obtained from the sensor to a predetermined threshold value and reduce the rotational speed of the motor when the measured value approaches the threshold value. Hereby, the change between the drive modes of the transmission may be facilitated.

For example, in the low torque/high speed drive mode, the quantity sensed may be a motor current indicative of the torque, such that as the current approaches the threshold value and thus as the torque in this case increases, the rotational speed of the motor may be decreased such that the shift to the high torque/low speed drive mode may be facilitated. Similarly, in the high torque/low speed drive mode, the quantity sensed may be a torque value from a torque transducer, such that as the torque value approaches the threshold value and thus as the torque in this case decreases, the rotational speed of the motor may be decreased such that the shift back to the low torque/high speed drive mode may be facilitated.

Accordingly, the at least one sensor may also be a sensor for sensing the motor current or a torque sensor, i.e. a torque transducer, or generally speaking even an internal feature of the control unit motoring the current or other motor parameters. In one embodiment, the torque transducer is only active in the high torque/low speed drive mode. The activation of such a transducer may be used as an indicator to the control unit that the transmission has switched to high torque/low speed mode.

According to one embodiment, the torque responsive transmission is a first stage gear unit. I.e., the input shaft in such an embodiment is directly connected to the motor, or even in some cases arranged in motor module of the tool. This is particularly advantageous in that a more compact and slim design of the tool may be achieved.

According to one embodiment, the power tool further comprises a front gear unit, or second stage gear unit. In such an embodiment the torque responsive transmission may be arranged between the motor and the front- or second stage gear unit. This is advantageous in that the front gear unit for such a tool may be an interchangeable front gear unit, such that the front gear unit may be changed depending on the desired torque while the torque-responsive transmission remains in or on the tool.

With regards to the power tool as such, according to one embodiment, the motor is an electric motor. The tool may for example be an electrical hand-held power tool chosen from the group comprising a screw driver, a nut runner, a drill and a grinder. The skilled person however realizes that only slight modification of the structure would be required for use with a stationary or fixtured tools. In some embodiments, the power tool may be a battery powered tool. In one embodiment, the power tool is a tool providing a higher tightening torque, for example in the range 3500-4500 Nm.

According to a third aspect of the present invention, a method for controlling a power tool comprising a gear unit according to any of the embodiments described above is provided.

According to one embodiment, the method comprises the steps of monitoring a quantity indicative of a first torque value, comparing the first torque value to a predetermined threshold torque value, and controlling the rotational speed of the motor when the measured value approaches the threshold value.

According to one embodiment, the step of controlling the rotational speed of the motor involves reducing the rotational speed of the motor when the measured value approaches the threshold value. According to one embodiment, the monitored quantity is at least one of a motor current and a torque transducer value.

Objectives, advantages and features of the method conceivable within the scope of the third aspect of the invention are readily understood by the foregoing discussion referring to the second aspect of the invention.

Further objectives of, features of and advantages of the present invention will become apparent when studying the following detailed disclosure, the drawings and the appended claims. Those skilled in the art realize that different features of the present invention can be combined to create embodiments other than those described in the following.

BRIEF DESCRIPTION OF THE DRAWINGS

The invention will be described in the following illustrative and non-limiting detailed description of exemplary embodiments, with reference to the appended drawing, on which

All figures are schematic, not necessarily to scale and generally only show parts which are necessary in order to elucidate the invention, wherein other parts may be omitted or merely suggested.

DETAILED DESCRIPTION

Figure 1:
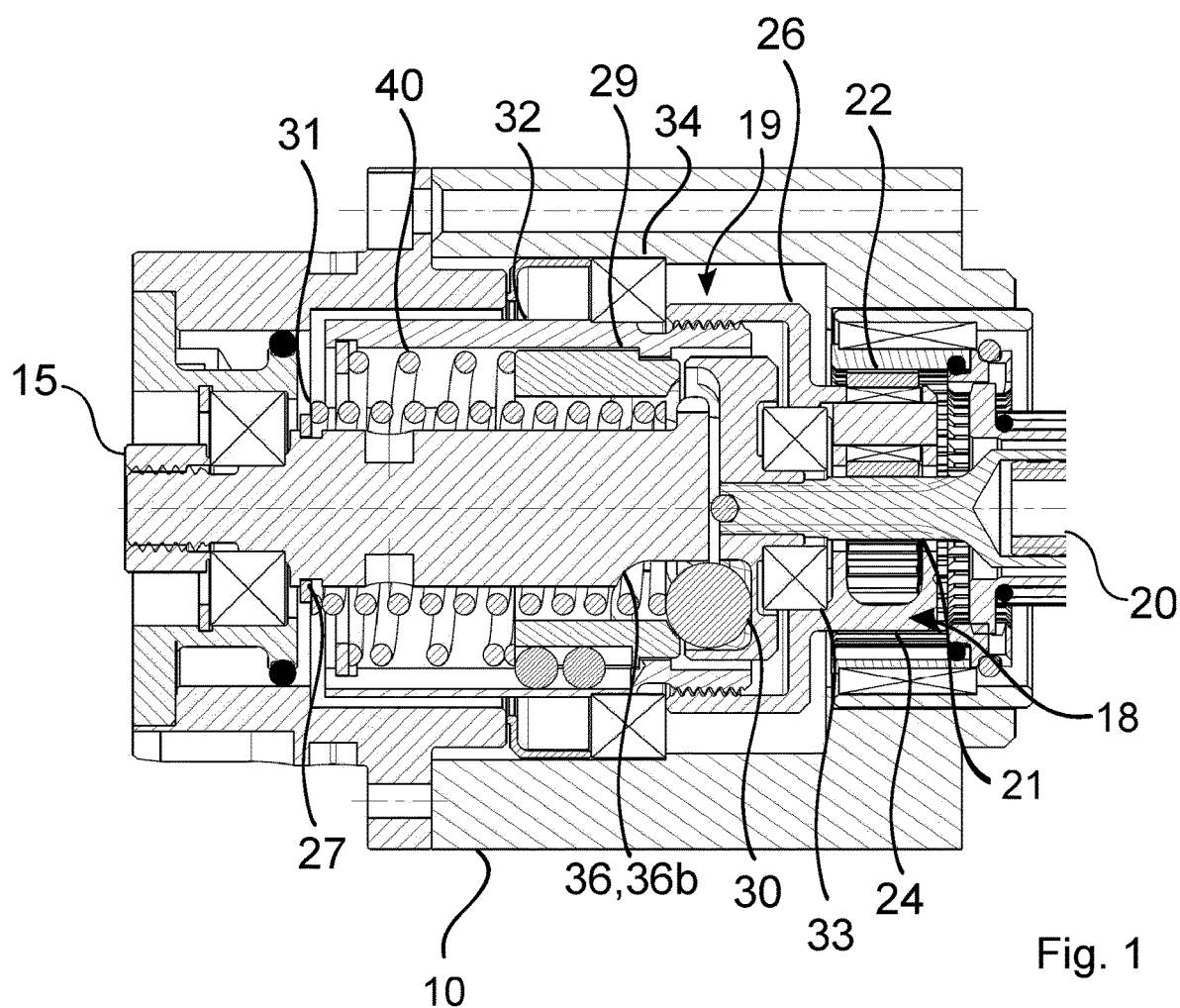
FIG. 1 is a cross sectional view of an exemplary two-speed power transmission for a power tool according to one embodiment.

FIG. 1 is a cross sectional view of a portion of an exemplary power tool according to one embodiment, in this case a handheld battery powered tool. The tool comprises a housing 10, an input shaft 20, a motor (not shown) connected to the input shaft, an output shaft 15 and a two-speed transmission arranged between the input shaft and the output shaft. Further, the tool comprises a torque transducer and a control unit operative to control the rotational speed of the motor which will be described in greater detail below when describing the functionality of the tool.

The two-speed power transmission 1 of the embodiment shown in FIG. 1 comprises a planetary gear 18 and a torque responsive gear shift mechanism 19 for directing torque from the input shaft 20 (i.e. from the motor) to the output shaft 15 through the planetary gear 18 in a high torque/low speed drive mode or past the planetary gear 18 in a low torque/high speed drive mode. The transmission is shown in FIG. 1 in the low torque/high speed drive mode.

The planetary gear 18 comprises a sun wheel 21 connected to the input shaft 20, a ring gear (or gear rim) 22 secured in the housing 10 and a planet wheel carrier 24. The gear shift mechanism 19 comprises a driving member 26 connected to the sun wheel 21 of the planetary gear 18 and a driven member 27 connected to the output shaft 15.

Coupling elements, in the illustrated embodiment three balls 30, are arranged to intercouple in a first position the driving member 26 and the driven member 27, i.e. in what is referred to above as the low torque/high speed drive mode, and to intercouple in a second position the planet wheel carrier 24 and the driven member 27, i.e. in what is referred to above as the high torque/low speed drive mode.

Figure 2:
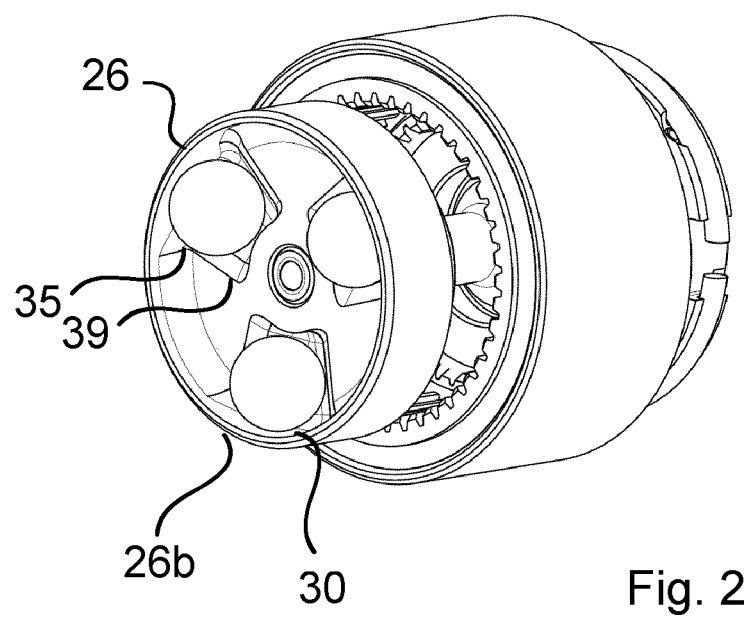
FIG. 2 is a first perspective view of some of the components of an exemplary transmission according to one embodiment.

Further, the driven member 27 comprises a number of axially extending grooves 36 arranged to support the balls 30 for axial displacement between the first and the second position, whereas the driving member 26 comprises an axially acting first cam means 35 arranged in equally spaced recesses 39 for cooperation with the coupling elements 30 in the first position of the coupling elements 30. These recesses 39 and cam means 35 are shown in FIG. 2 and will therefore be described in greater detail below.

A first axially acting coil spring 31 is coaxially arranged with respect to the driven member for biasing the balls 30 towards the first position, whereby the action of the coil spring 31 thereby counteracts the axial force developed by the first cam means 35 on the balls 30. Hereby, the balls 30 are maintained in the first position at torque values below a predetermined level but forced out of the first position by the first cam means 35 at torque values above the predetermined level. In the illustrated embodiment, the spring 31 bears directly against the balls 30.

The driven member 27 in turn comprises second, axially acting cam means 36b arranged to exert an axial shifting force upon the balls 30 toward the second position of the balls 30 against the biasing action of the coil spring 31 as the balls 30 have left the first position at torque values above the predetermined level.

Further, in the illustrated embodiment, the planet wheel carrier 24 is coupled to an axially movable coupling sleeve 29 which provides a radial support for the balls 30 in the second position. Therefore, a number of axially extending tracks 38 for cooperation with the balls 30 are arranged in an inner surface of the coupling sleeve 29 (discussed in further detail below with reference to FIG. 3). The number of tracks 38 in the illustrated embodiment the coupling sleeve 29 is twice the number of balls 30, i.e. six in the illustrated embodiment. Further, the coupling sleeve 29 is in the illustrated embodiment biased against the balls 30 by second axially acting coil spring 40, the coil spring 40 being coaxially arranged with respect to the driven member 27 as well as to the first coil spring 31.

In order to intercouple the planet wheel carrier 24 and the driven member 27 in the second position, the planet wheel carrier 24 comprises an outer sleeve 32. This sleeve 32 extends in an axial direction and is rotationally locked to the coupling sleeve 29 by means of a number of smaller balls 32a. Further, in order to handle the forces from the first coil spring 31 acting on the balls 30, a first axial bearing 33 is provided supporting the driving element, or member, 26 against the planet wheel carrier 24 and a second axial bearing 34 is provided to support this outer sleeve 32 against the housing (10), such that the force may be absorbed by the housing.

Turning to FIG. 2, the driving member 26 and three coupling balls 30 may be viewed in greater detail. In order to receive and radially support the balls 30 in the first position the driving member comprises a number of recesses 39, each adapted to receive one ball 30. As may also be seen from FIG. 2, the first axially acting cam element(s) 35 each form part of respectively one of the recesses 39, for example the cam elements may comprise sloping side portions of the recesses 39. Further, the driving member 26 comprises an axial flange 26b arranged to provide further radially supports. In order to ensure that the balls do not make radial contact with surrounding components rotating at a different rotational speed, the combined axial extent of this flange 26b and the depth of the recesses 39 is larger than the radius of the balls 30.

Figure 3:
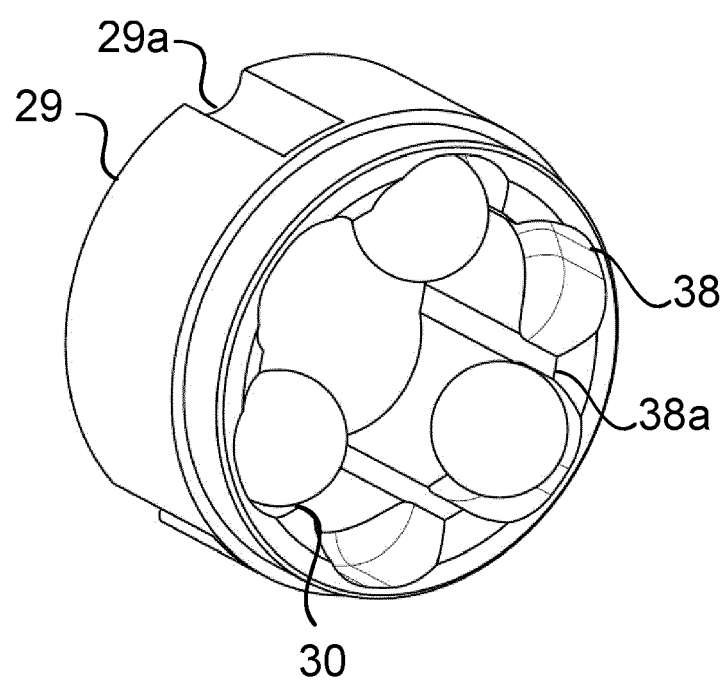
FIG. 3 is a second perspective view of some of the components of an exemplary transmission according to one embodiment.

Finally, the coupling sleeve 29 is shown in greater detail in FIG. 3, a perspective view of an exemplary embodiment of the coupling sleeve and again three balls 30. In FIG. 3, the balls are arranged in the second mode and hence arranged in the tracks 38, formed between equally spaced ridges 38a formed in an inner surface of the sleeve 29. In the outer surface of the sleeve 29, tracks 29a arranged to receive the smaller balls providing the rotational lock to the planet carrier 24 are shown. The second coil spring 40 mentioned above is provided for the less likely case of an angular misalignment between the balls 30 and the tracks 38 upon transition of the balls which may cause a less smooth transition, where the bias of the spring 40 is provided to gently force the sleeve into alignment with the balls thereby avoiding any noticeable jamming.

Returning to FIG. 1, it may be noted that the ring gear (or gear rim) 22 of the planetary gear mechanism is secured in the housing 10 at least partly by means of a torque transducer (not shown) such that measurements of the torque transferred may be provided. This will be described in greater detail in the following as the functionality of the inventive transmission will be explained.

In operation, the input shaft 20 is connected to an electrical motor, and the output shaft 15 is coupled to a screw joint to be tightened via a nut socket. The functionality of the transmission and hence the power tool is achieved by the transmission selectively providing a connection between the driving member 26 and the driven member 27, either bypassing- or via the planetary gear mechanism depending on the torque level.

When the tightening operation starts, the motor starts delivering a torque through the transmission. In a first stage, as the gear shift mechanism 19 occupies a high speed/low torque drive mode, the balls 30 are seated in the recesses 39 of the driving member 26 and the torque delivered to the driving member 26 via input shaft 20 is transferred via the recesses 35, the balls 30 and the grooves 36 to the driven member 27, i.e. directly from the driving member 26 to the driven member 27 without any influence by the planetary reduction gear 18. The planet wheel carrier 24 rotates freely in the housing 10.

As the torque resistance in the screw joint increases, the first axially acting cam elements 35 apply increasing axial forces upon the balls 30, and when a predetermined torque level is reached this force supersedes the biasing force of spring 31 and the balls 30 will start moving axially through the grooves 36, where eventually the cam means 36b will apply an auxiliary axial force on the balls 30 as well, again eventually superseding the force of the spring 31 and thus allowing the balls 30 to complete their axial movement and occupy their second position. Examples of such cam means 36b include sloping side or diverging portions of the respective grooves 36. Now, the gear shift mechanism 19 has brought the transmission into its high torque/low speed drive mode.

This drive mode is maintained as long as the transferred torque is high enough to make the action of the second cam means 36b dominate over the biasing force of spring 31. When the torque has decreased to that level, i.e. when the predetermined drive mode shifting point is reached, the force exerted by cam means 36b will no longer dominate over the spring force, and the balls 30 are shifted back to their first position.

In order to facilitate this intercoupling, more particularly to facilitate the gear change, the power tool as mentioned above comprises a sensor (not shown), in this case a torque transducer, and further a control unit (not shown) operative to receive the sensed data from the torque transducer and control the rotational speed of the motor accordingly. More particularly, as the measured torque value approaches the predetermined threshold torque value, i.e. the value at which a gear change is to take place, the control unit reduces the rotational speed of the motor.

As in the illustrated embodiment, the torque transducer is arranged between the housing 10 and the gear rim 22, it follows that the transducer is only active (i.e. gives meaningful readings) in the second drive mode, i.e. high torque/low speed drive mode, when torque is actually directed over the ring gear the procedure described above using the data from the transducer to control the speed is hence only relevant when determining when to switch from the high torque/low speed drive mode to the low torque/high speed drive mode.

As the transmission operates in the low torque/high speed drive mode, the control unit instead monitors the motor current by means of a suitable circuit arrangement (not shown) in order to determine that the torque is approaching the threshold value and that the rotational speed therefore should be decreased in order to facilitate the gear change. As an additional functionality, the notion that the torque transducer start delivering torque data may be used by the control unit to confirm that the transmission has switched to and is operating in the high torque/low speed drive mode.

While the invention has been illustrated and described in detail in the drawings and foregoing description, such illustration and description are to be considered illustrative or exemplary and not restrictive; the invention is not limited to the disclosed embodiment. The skilled person understands that many modifications, variations and alterations are conceivable within the scope as defined in the appended claims. Additionally, variations to the disclosed embodiments can be understood and effected by those skilled in the art in practicing the claimed invention, form a study of the drawings, the disclosure and the appended claims. In the claims, the word "comprising" does not exclude other elements or steps and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the claims.

The invention claimed is:

1. A two-speed power transmission configured for use in a power tool, said power tool comprising a housing; an input shaft; and an output shaft, wherein said two-speed power transmission comprising:
   a planetary gear comprising a sun wheel connected to said input shaft, a ring gear secured in the housing, and a planet wheel carrier;
   a torque responsive gear shift mechanism for directing torque through said planetary gear in a high torque/low speed drive mode or past said planetary gear in a low torque/high speed drive mode, said gear shift mechanism comprising a driving member connected to the sun wheel of said planetary gear, a driven member connected to said output shaft, and a number of coupling elements arranged to intercouple in a first position said driving member and said driven member and to intercouple in a second position said planet wheel carrier and said driven member,
   wherein said driven member comprises a number of axially extending grooves arranged to support said coupling elements for axial displacement of said coupling elements between said first and said second position,
   wherein said driving member comprises:
      an axially acting first cam means for cooperation with said coupling elements in said first position of said coupling elements;
      a first, axially acting spring means configured for biasing said coupling elements toward said first position of said coupling elements, whereby the action of said first spring means counteracts the axial force developed by said first cam means upon said coupling elements, such that said coupling elements are maintained in said first position at torque values below a predetermined level but forced out of said first position by said first cam means at torque values above said predetermined level; and
      a second, axially acting cam means provided in said axially extending grooves and arranged to exert an axial shifting force upon said coupling elements toward said second position of said coupling elements against the biasing action of said spring means as said coupling elements have left said first position at torque values above said predetermined level,
   wherein said planet wheel carrier is coupled to a coupling sleeve which provides a radial support for said coupling elements in said second position of said coupling elements only and which is provided with a number of axially extending tracks for cooperation with said coupling elements in said second position of said coupling elements, and
   wherein said driving member comprises a number of recesses, wherein said first axially acting cam element each form part of respectively one of said recesses, and wherein each of said recesses are adapted for receiving and radially supporting one of said coupling elements in said first position of said coupling elements, such that each of said coupling elements are shielded and rotationally decoupled from the coupling sleeve in said high speed/low torque mode.

2. Two-speed power transmission for a power tool according to claim 1, wherein said coupling sleeve is arranged to be axially movable.

3. Two-speed power transmission for a power tool according to claim 2 further comprising a second axially acting spring means for biasing said axially movable coupling sleeve against of said coupling elements.

4. Two-speed power transmission for a power tool according to claim 1, wherein said planet wheel carrier comprises an outer sleeve, said outer sleeve extending in an axial direction and being rotationally locked to said coupling sleeve to intercouple in said second position said planet wheel carrier and said driven member.

5. Two-speed power transmission for a power tool according to claim 4, wherein a first axial bearing is provided supporting said driving element against said planet wheel carrier, and wherein a second axial bearing is provided to support said outer sleeve against said housing, such that the force from said first spring means acting on said coupling elements may be absorbed into said housing via said first and second bearing.

6. Two-speed power transmission for a power tool according to claim 1, wherein said coupling elements comprise equally sized balls.

7. Two-speed power transmission for a power tool according to claim 1, wherein the number of tracks in the coupling sleeve is twice the number of coupling elements.

8. Two-speed power transmission for a power tool according to claim 1, wherein said driving member comprises an axial flange, said axial flange being arranged to radially support said coupling elements.

9. Two-speed power transmission for a power tool according to claim 8, wherein said coupling elements comprise equally sized balls, wherein the number of tracks in the coupling sleeve is twice the number of coupling elements, and wherein the combined axial extent of said flange and the depth of said recesses being larger than the radius of said balls.

10. Two-speed power transmission according to claim 1, wherein said coupling elements comprise equally sized balls, and wherein said first spring means comprises a first coil spring which is arranged in a coaxial relationship with said driven member and which exerts a biasing force upon said balls.

11. Power tool comprising:
a housing;
an input shaft;
an output shaft;
a motor;
a two-speed power transmission according to claim 1;
means for monitoring a quantity indicative of a torque delivered by the tool; and
a control unit operative to control the rotational speed of the motor based on said sensed quantity indicative of said torque.

12. Power tool according to claim 11, wherein said means for monitoring a quantity indicative of a torque delivered by the tool comprises at least one of a torque transducer and a circuit arrangement adapted to monitor the motor current.

13. A method for controlling a power tool,
wherein the power tool comprises:
a housing;
an input shaft;
an output shaft;
a motor;
a two-speed power transmission according to claim 1;
means for monitoring a quantity indicative of a torque delivered by the tool, wherein said means for monitoring a quantity indicative of a torque delivered by the tool comprises at least one of a torque transducer and a circuit arrangement adapted to monitor the motor current; and
a control unit operative to control the rotational speed of the motor based on said sensed quantity indicative of said torque,
wherein the method comprises:
monitoring a quantity indicative of a first torque value;
comparing said first torque value to a predetermined threshold torque value; and
controlling the rotational speed of the motor when said measured value approaches said threshold value by reducing the rotational speed of the motor when said measured value approaches said threshold value.

14. Method according to claim 13, wherein said quantity is at least one of a motor current value or a torque transducer value.

* * * * *